US006657940B1

(12) United States Patent
Takeda et al.

(10) Patent No.: US 6,657,940 B1
(45) Date of Patent: Dec. 2, 2003

(54) HOUSING WITH MINIMIZED SPACE REQUIREMENTS WHEN OPENING AND CLOSING A LID

(75) Inventors: Kunio Takeda, Sagamihara (JP); Hirotoshi Yokono, Sagamihara (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/138,998

(22) Filed: Aug. 25, 1998

(30) Foreign Application Priority Data

Aug. 25, 1997 (JP) ........................................ 9-275004

(51) Int. Cl.[7] ........................................ G11B 33/02
(52) U.S. Cl. ........................................ 369/75.1
(58) Field of Search .................... 369/75.1, 78, 75.2; 360/97.01; 361/685

(56) References Cited

U.S. PATENT DOCUMENTS 4,530,081 A * 7/1985 Sakurai et al.

FOREIGN PATENT DOCUMENTS

JP 404098675 A * 3/1992

* cited by examiner

*Primary Examiner*—Julie Anne Watko
(74) *Attorney, Agent, or Firm*—Laurie Gathman

(57) ABSTRACT

The space required for an apparatus with a motor-driven lid, such as a CD player, is minimized. The lid is guided by an internal gear under the lid, and a follower wheel under the lid. The wheel rides in a guide groove at the rear of the apparatus housing. A drive motor rotates a pinion which engages a short rack and moves the lid straight rearwards while the follower wheel rides in a horizontal groove portion. The rack merges into an internal gear, so that continued pinion rotation raises that part of the lid while moving it rearward. At the same time, the follower wheel rides along a downwardly extending curved groove portion, so that the rear edge of the lid moves to a lower position while the front of the lid moves up and rearward, exposing an opening in the housing for access to the interior.

15 Claims, 8 Drawing Sheets

HOUSING WITH MINIMIZED SPACE REQUIREMENTS WHEN OPENING AND CLOSING A LID

The invention relates to a housing comprising a main body, an opening provided in the main body, a lid for covering the opening, and a mechanism for opening and closing the lid.

The invention further relates to a disc player provided with a housing and a scanning unit for scanning an information disc, said scanning unit being provided in a main body of the housing and having a turntable for the information disc which is accessible via an opening provided in the main body and covered by means of a lid.

A conventional lid opening/closing mechanism 1*b* for opening/closing a lid attached to a body is known in which, as shown in FIG. 11, a lid 3*b* is attached to the vicinity of an opening 4*b* of a body 2*b* by means of hinges 5*b*, and the opening 4*b* is opened or closed by turning the lid 3*b* in the direction of arrow Ab or arrow Bb with respect to the body 2*b*. Also, a lid opening/closing mechanism 1*c* is known in which a lid 3*c* opens or closes an opening 4*c* by sliding the lid 3*c* in the direction of arrow Ac or arrow Bc along the opening 4*c* of a body 2*c*. For the lid opening/closing mechanism 1*b*, a space for turning the lid 3*b* with respect to the body 2*b* is necessary for the lid 3*b* to open and close the opening 4*b* of the body 2*b*. Therefore, there arises a problem in that even if the body 2*b* and the lid 3*b* are kept compact, a substantially large space is necessary as the whole system 100*b* when the opening/closing operation of the lid 3*b* is considered. In another known housing shown in FIG. 12, a system 100*c* includes a lid opening/closing mechanism 1*c*, which slides the lid 3*c* in the direction of arrow Ac or arrow Bc with respect to the body 2*c* to open and close the opening 4*c* of the body 2*c*. Therefore, there arises a problem in that even if the body 2*c* and the lid 3*c* are kept compact, a longitudinal space must be kept clear behind the main body for the opening/closing operation of the lid 3*c*, so that a substantially large space is necessary for the,operation of the whole system 100*c*.

Downsizing of the system including the space for handling has been demanded particularly for current house holds. For tape recorders and VTRs, therefore, an opening for loading/unloading a cassette tape is mainly provided on the front face of the system body. However, for record players and CD players, an opening for loading/unloading a record or CD is provided on the top face of the system body in most cases in view of the operation of the pickup and the like, so that a large space required for the operation of a lid presents a serious problem.

SUMMARY OF THE INVENTION

The present invention was made in view of the above situation, and accordingly an object thereof is to provide a housing and a disc player of the kinds mentioned in the opening paragraphs which comprise a lid opening/closing mechanism in which the space occupied by a lid, when the opening/closing operation is performed, is kept small, and the space required by the whole system in operation is made compact.

To accomplish this object, the housing in accordance with the invention is characterized in that the mechanism comprises:

a drive unit for moving the lid relative to the main body, said drive unit comprising a first part secured to the main body and a second part secured to the lid for cooperation with the first part;

and a guide provided between the main body and the lid for guiding the movement of the lid;

said mechanism operating under the influence of a driving force of the drive unit in a first direction to move the lid relative to the main body over a first distance in a first linear direction, and to subsequently rotate the lid relative to the main body over a second distance in a first rotational direction, whereby the rear edge of the lid is lowered from an initial position to a lower position and the opening of the main body is uncovered;

and said mechanism operating under the influence of a driving force of the drive unit in a second reverse direction to rotate the lid relative to the main body over said second distance in a second reverse rotational direction, whereby the rear edge of the lid returns from the lower position into the initial position, and to subsequently move the lid relative to the main body over said first distance in a second reverse linear direction, whereby the opening of the main body is closed.

The disc player in accordance with the invention is characterized in that the housing used therein is a housing in accordance with the invention.

In this manner, the housing and the disc player according to the present invention are configured so that the operation of the lid from the closed position to the open position is performed when the lid turns with respect to the main body and the rear edge of the lid takes a low position after the lid moves a certain distance rearward in a linear direction with respect to the main body, and also the operation of the lid from the open position to the closed position is performed when the lid moves in the reverse linear direction with respect to the main body after the lid has turned with respect to the main body and the read edge of the lid returns to the initial position from the lower position. According to the present invention, after the lid moves in the first linear direction relative to the main body, it then turns relative to the body, and the movement of the rear edge of the lid is guided so as to take a lower position relative to the main body by a distance which is determined by the guide by which the lid is guided. Therefore, the space occupied by the lid, while the opening/closing operation is being performed, is kept small, and the space required by the whole system in operation is made compact.

Embodiments of the present invention will be described below with reference to the accompanying drawings. However, the present invention is not limited to these embodiments.

DESCRIPTION OF THE PREFERRED EMBODIMENTS

Figure 1:
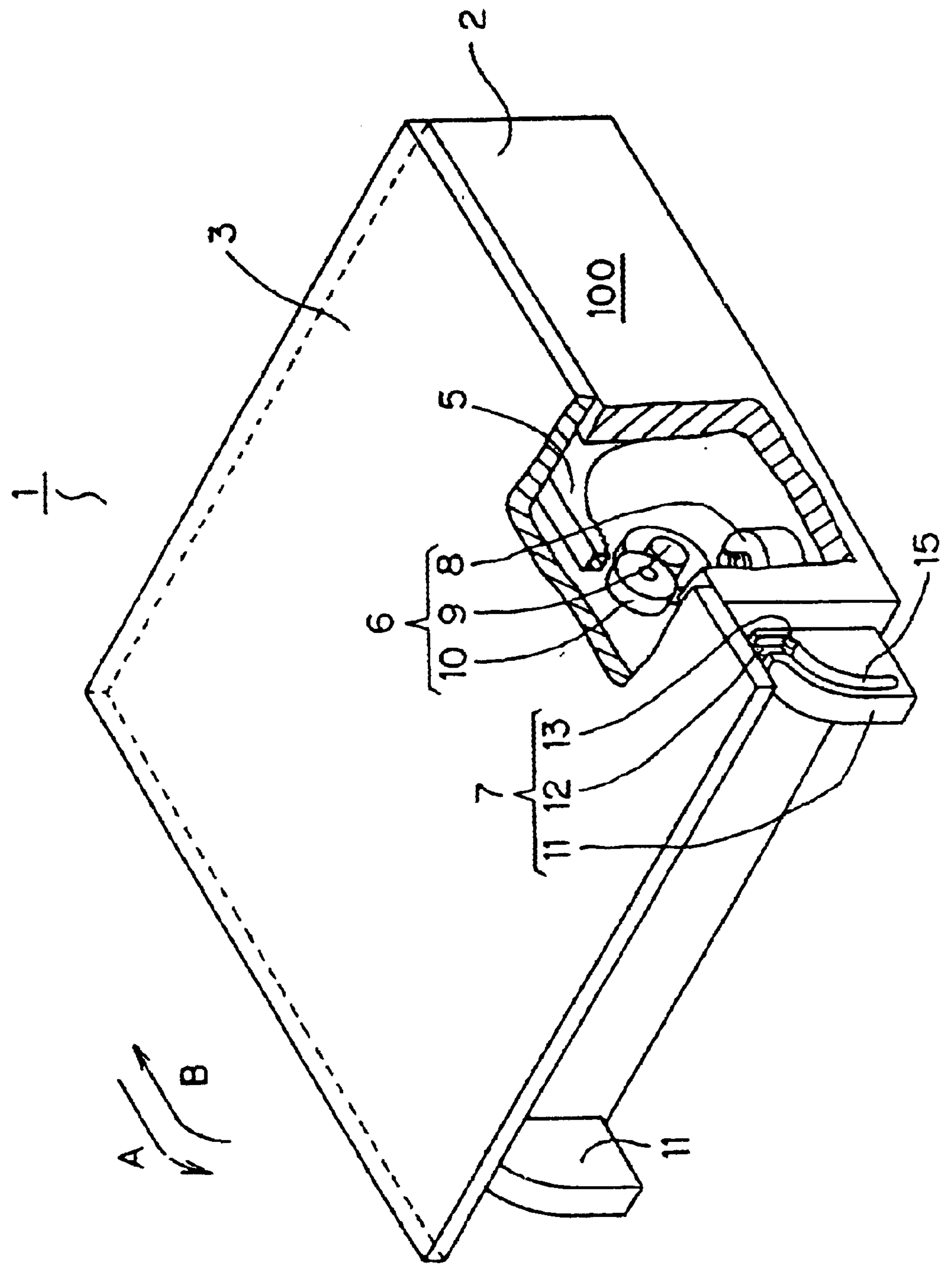
FIG. 1 shows a perspective view, as viewed from behind-above, of a first embodiment of a housing according to the invention which is incorporated into a CD player according to the invention.

As shown in FIGS. 1 to 6, a lid opening/closing mechanism 1, which is incorporated in a CD player 100 that has body 2, a lid 3 includes an engagement body 5, an output drive 6, and a guide arrangement 7. The body 2 is formed with an opening 4 at the upper part thereof. The opening 4 permits a user to place and remove a CD onto and from a turntable (not shown) which forms part of a scanning unit (not shown) of the CD player disposed within the body 2. The lid 3 is used to close the opening 4 of the body 2. When the opening 4 of the body 2 is open, the lid 3 is supported on the body 2 by the engagement body 5 and a support member 12. The engagement body 5, which has a gear rack merging into a partial internal gear is attached to the bottom surface of the lid 3. The pitch, tooth form, and the like of the engagement body 5 are selected so as to mesh with the output pinion gear, described later.

The output drive 6 is disposed on the side of the interior of the body 2. The output drive 6, which includes an output motor 8, a reduction gear train 9, a pinion gear 10, and the like, is used to slide and turn the lid 3 in the normal and reverse directions (in the directions of arrow A and arrow B) with respect to the body 2 by engaging with the engagement body 5. The guide 7 includes a set of regulating bodies 11 attached to the back face of the body 2, support members 12 attached to the lid 3 in such a manner as to depend from the bottom surface thereof, and rotating bodies follower wheels 13 each pivotally mounted at the tip end portion of the support member 12.

Figure 6:
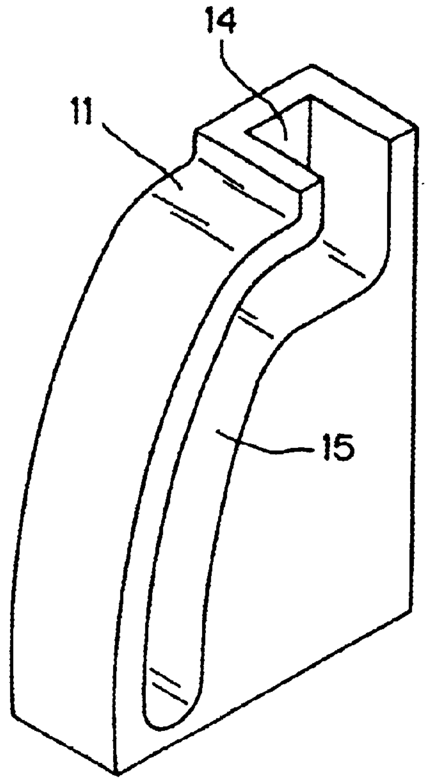
FIG. 6 shows a perspective view of a regulating body of the guide of the first embodiment of the housing of FIG. 1.

As shown in FIG. 6, the regulating body 11 is formed with a groove 15 which extends from atop opening 14 at a substantially vertical downward angle, then extends in a substantially horizontal rearward direction, and then further extends in a substantially parabolic curve in the rear downward direction. Also, the groove 15 is formed with a width slightly larger than the diameter of the follower wheel 13 to allow free rolling of the wheel along the groove When a CD player 100 is loaded or unloaded that is, when the lid opening/closing mechanism 1 is operated, as shown in FIGS. 2 to 5, the CD player 100 is used in a state in which the follower wheels guided by the grooves 15 of the regulating bodies 11. Specifically, the lid 3 is supported by the whole top face of the body 2 at first, but it is supported by by the pinion gear 10 and the support members 12 in the grooves 15. Therefore, the guide 7 operates after the engagement body 5 receives a drive force in the normal direction from the driver gear 10 of the output pinion 6 and the lid 3 slides a fixed distance in the direction of arrow A with respect to the body, and the lid 3 turns with respect to the body 2 by a distance corresponding to the output of the output pinion gear 10 so that the rear edge of the lid 3 moves to a low position, by which the opening 4 of the body 2 is changed from the closed state to the open state.

Also, when the output pinion gear 10 is turned in the reverse direction, the engagement body 5 receives a drive force in the reverse direction and the lid 3 turns with respect to the body 2 so that the rear edge of the lid 3 moves from the low position to the original position, and then the operation ceases. By turning and sliding the lid 3 in the direction of arrow B with respect to the body 2, the movement of the lid 2 is regulated and guided so that the opening 4 is changed from, the open state to the closed state. That is to say, the guide 7 supports the lid 3 when fully open, but performs the opening/closing the opening 4 of the body 2 by means of the lid 3 by changing the support position in the horizontal longitudinal direction and in the vertical direction.

Figure 2:
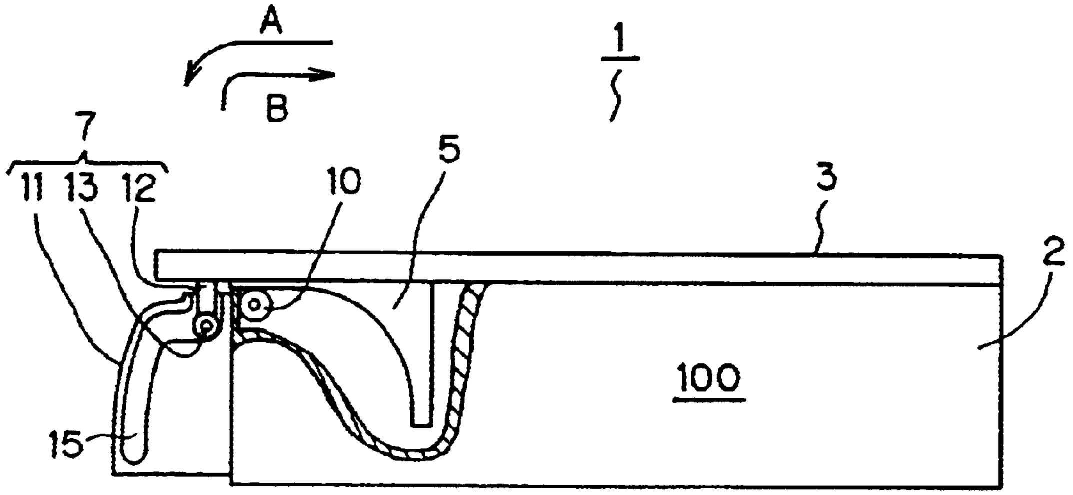
FIG. 2 shows a left side view of the first embodiment, which explains an operation condition of a guide of the housing of FIG. 1 when the lid is in a closed position.
Figure 3:
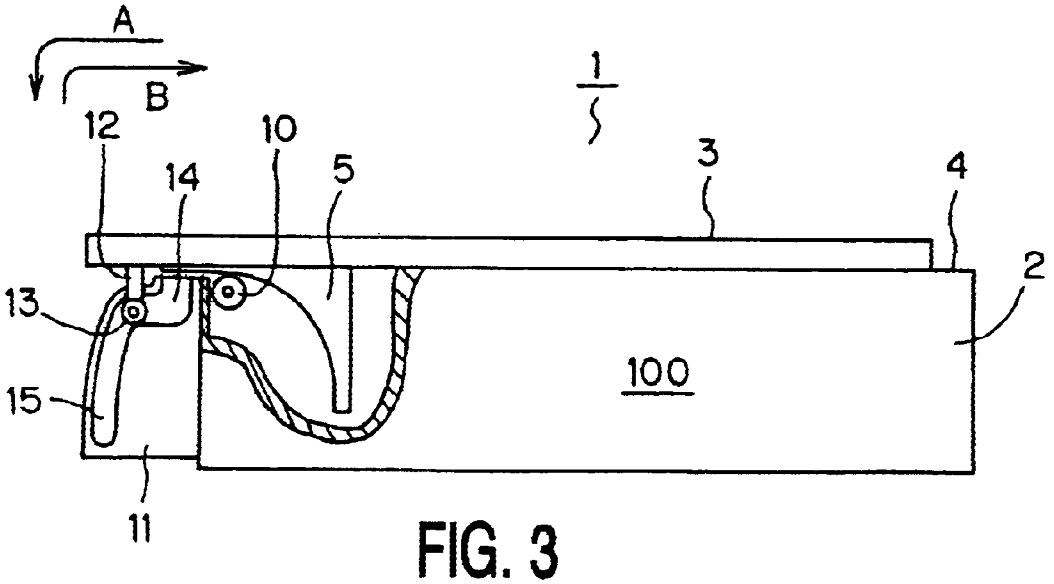
FIG. 3 shows a left side view of the first embodiment, which explains an operating condition of a guide of the housing of FIG. 1 when the lid is moved to be in a partially open position.
Figure 4:
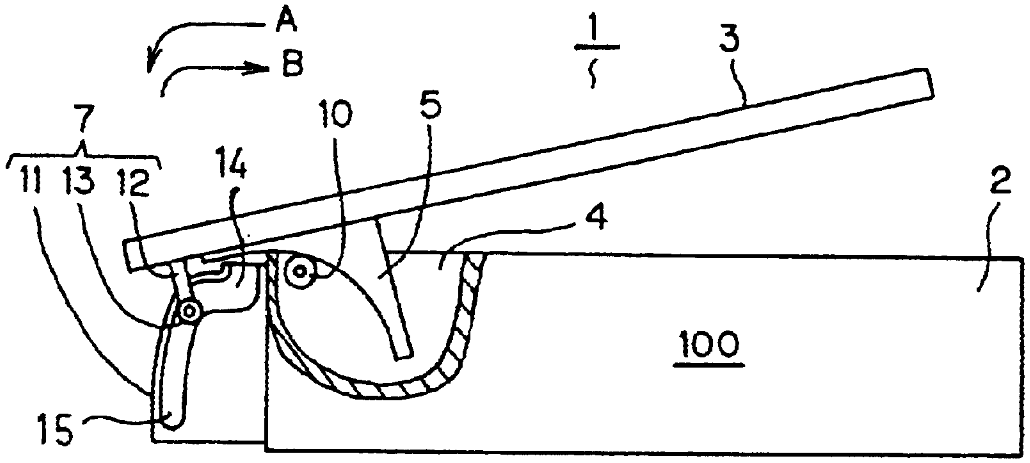
FIG. 4 shows a left side view of the first embodiment, which explains an operating condition of a guide of the housing of FIG. 1 when the lid is rotated to be in an open position.
Figure 5:
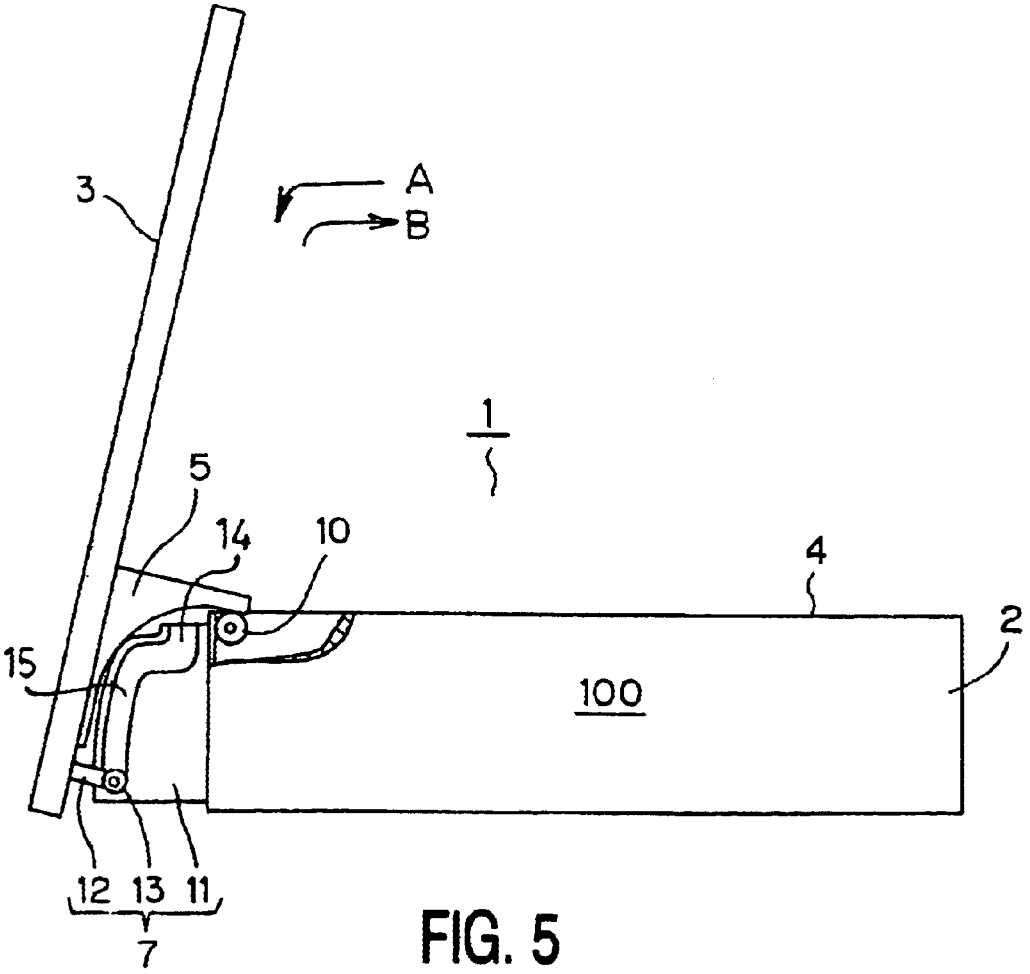
FIG. 5 shows a left side view of the first embodiment, which explains an operating condition of a guide of the housing of FIG. 1 when the lid is rotated to be in a maximum open position.

The lid opening/closing mechanism 1 is configured as described above. The following is a description of the operation thereof. When the user drives the output drive 6 in the first state of the CD player 100 as shown in FIGS. 1 and 2 (in a closed state of the lid 3), the pinion gear 10 is rotated and outputs a rotating drive force to the engagement body 5 upon receiving the drive force from the output pinion gear 10, the engagement body 5 slides the lid, which is integral with the engagement body 5, in the horizontal rearward direction, that is, in the direction of arrow A. As a result the opening 4 of the body 2 reaches a state in which a front part thereof is open (see FIG. 3). When the engagement body 5 further receives the drive force from the output pinion gear 10, the lid 3 integral with the engagement body 5 tries to slide in the horizontal rearward direction, but the follower wheel 13 rotating mounted at the tip end of the support member 12 supporting the lid 3 moves by being regulated and guided along the wall of the groove 15 in the regulating body 11, so that it takes a low position. As a result, the lid 3 goes back while being turned to a posture determined by the supporting pinion gear 10 and the follower wheel 13. During this process the opening 4 of the body 2, which is a casing for the CD player 100, becomes in a further opened state (see FIG. 4). When follower wheel 13 reaches the end of the groove 15 of the regulating body 11, a limiter (not shown) operates to stop the output of the output pinion gear 6. Here, the opening 4 of the body 2, which is a casing for the CD player 100, reaches its most open state. Thus, the user of the CD player 100 can perform the desired operation such as the placement of a CD on the turntable (not shown) disposed in the body 2 via the opening 4.

After the operation in the body 2 is finished, the user operates the output drive 6 in the reverse direction. Here, with the output of the output pinion gear 6 in the reverse direction, a drive force in the direction opposite to arrow A, that is, a drive force for turning and sliding the lid 3 in the direction of arrow B is provided via the engagement body 5. That is to say, when the engagement body 5 receives the drive force in the reverse direction, the follower wheel 13 is regulated and guided by the substantially parabolic portion of the groove 15 of the regulating body 11, so that the lid 3 turns in the direction of arrow B with respect to the body 2 and the rear edge of the lid 3 moves from the low position to the original height. Subsequently, after the rotating operation i released, the lid 3 further slides in the direction of arrow B with respect to the body 2, so that the opening 4 changes from the open state to the closed state. When the lid 3 returns to the original position with respect to the body 2, a limiter (not shown) operates to stop the output of the drive 6. Here, the opening 4 of the body 2 remains in the closed state by means of the lid 3.

The lid opening/closing mechanism 1 is configured as described above. Therefore, when the opening 4 of the body 2 is opened or closed by means of the lid 3, the lid 3 is slid horizontally and turned with respect to the body 2, so that the space required for the operation of the lid 3 can be decreased. As a result, the operating volume required for the whole system is kept small.

In the CD player 100, the lid 3 is supported on the side of the body 2 by the engagement body and the follower wheel 13, and the engagement body 5 is only placed on the pinion gear 10. Also, in the regulating guide 7, a clearance is provided between the follower wheel 13 and the groove 15 in the regulating body 11. Therefore, the lid 3 can be easily removed from the body 2 by raising it upward vertically, so that the CD player can be used while the lid 3 is not installed.

The following is a description of another embodiment of the present invention. As shown in FIGS. 7 to 10, a lid opening/closing mechanism 1, which is incorporated in a CD player 100*a*, having a body 2*a*, lid 3*a* includes, an engagement body 5*a*, an output pinion gear 6*a*, and a guide means 7*a*. The lid 3*a* is used to close an opening 4*a* of the body 2*a*. When the opening 4*a* of the body 2*a* is open, the lid 3*a* is supported on the body 2*a* by the engagement body 5*a* and a support member 12*a*. The engagement body 5*a*, the output pinion gear 6*a*, and the guide means 7*a* operate like those in the lid opening/closing mechanism 1 of the above embodiment.

Figure 10:
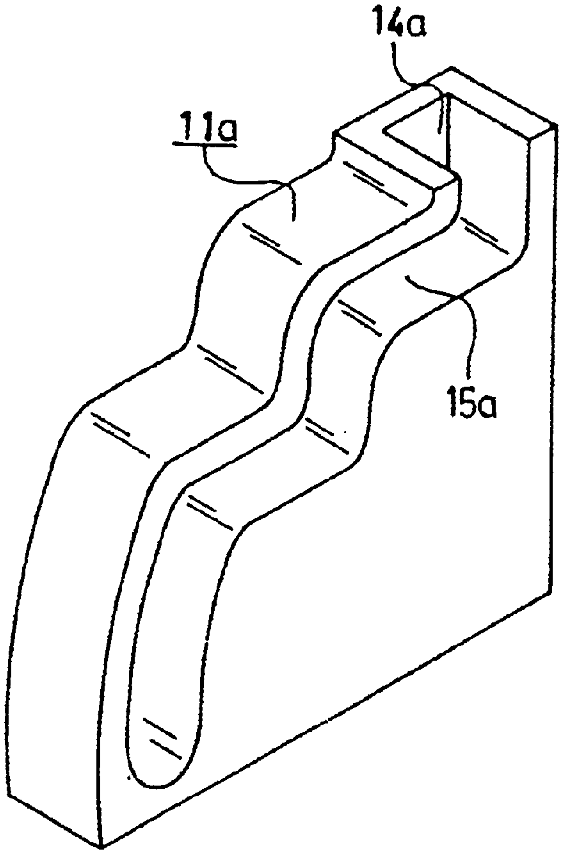
FIG. 10 shows a view corresponding to FIG. 6 of the second embodiment shown in FIG. 7.
Figure 7:
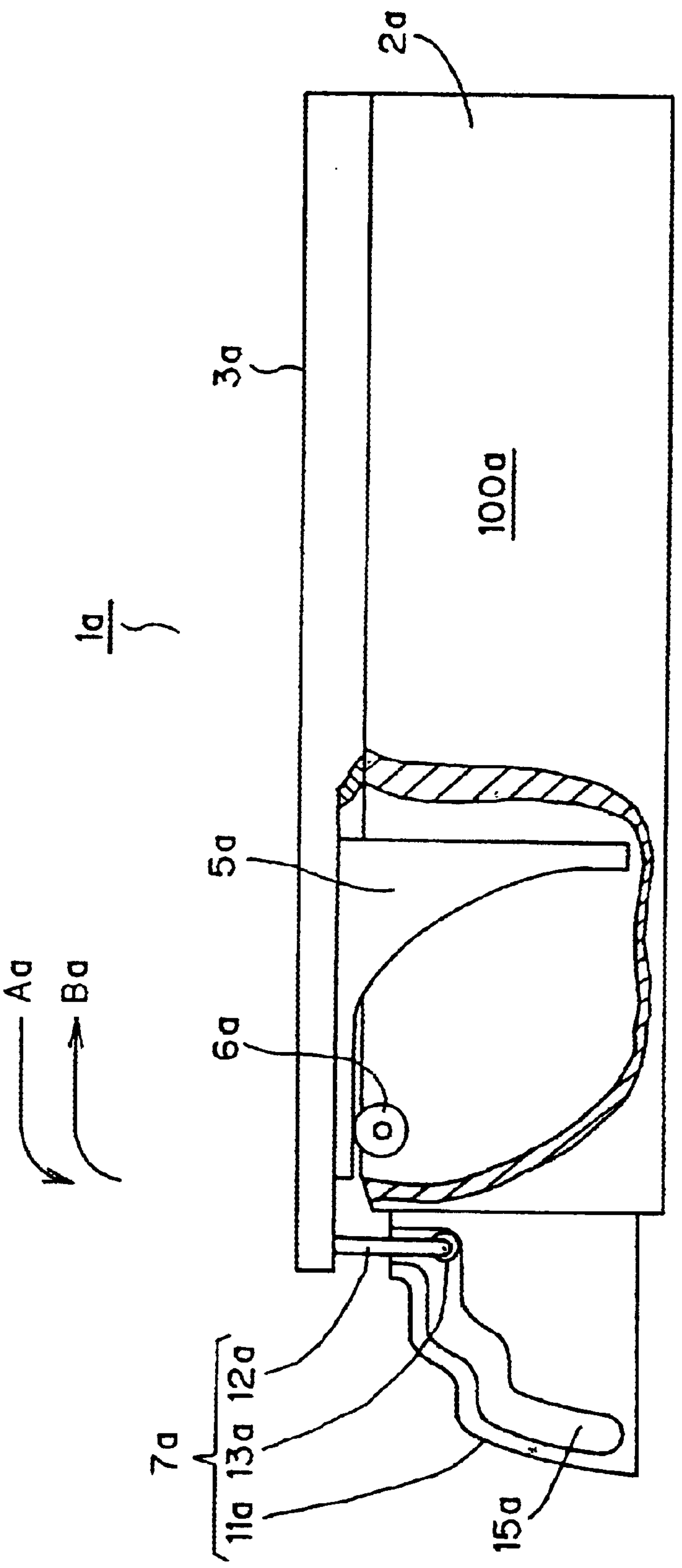
FIG. 7 shows a view, corresponding to FIG. 2, of a second embodiment in which a housing according to the invention is incorporated into a CD player according to the invention.
Figure 8:
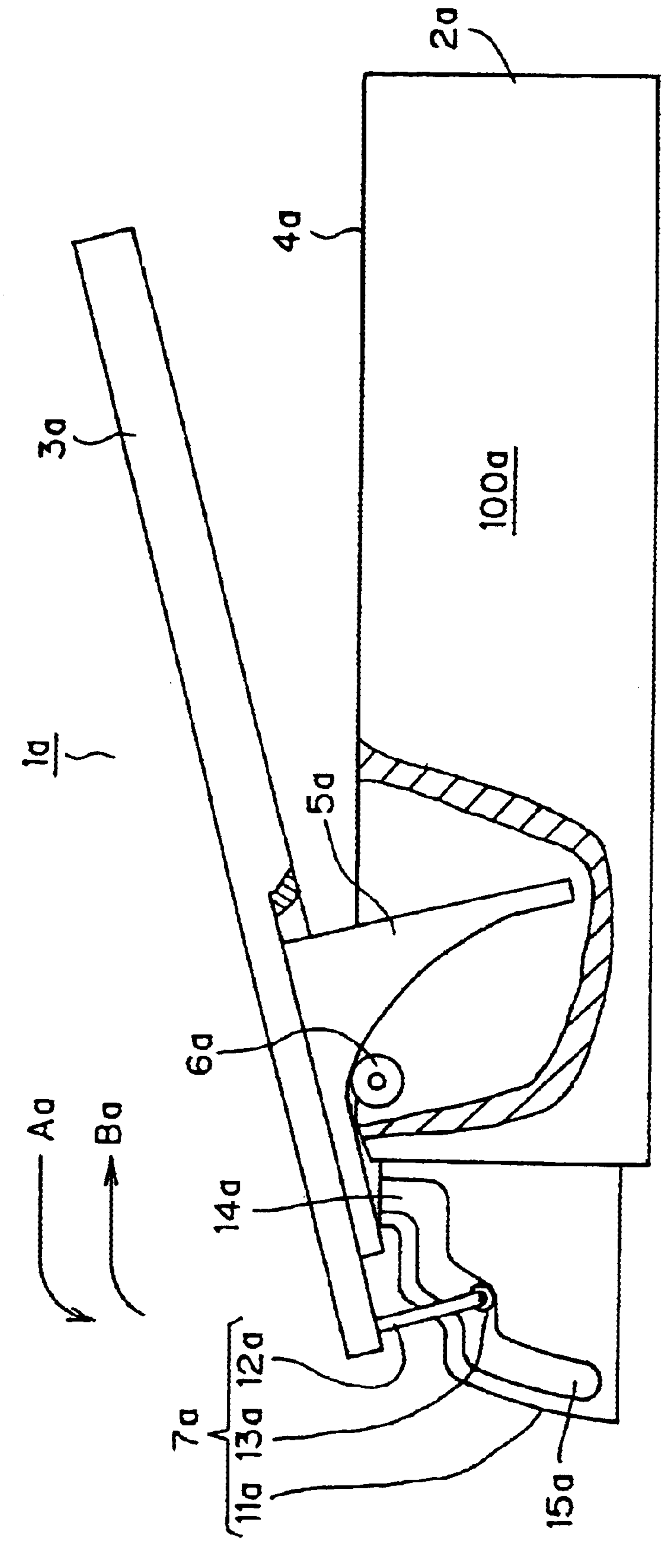
FIG. 8 shows a left side view of the second embodiment shown in FIG. 7, which explains an operating condition of a guide of the housing when the lid in an open state.
Figure 9:
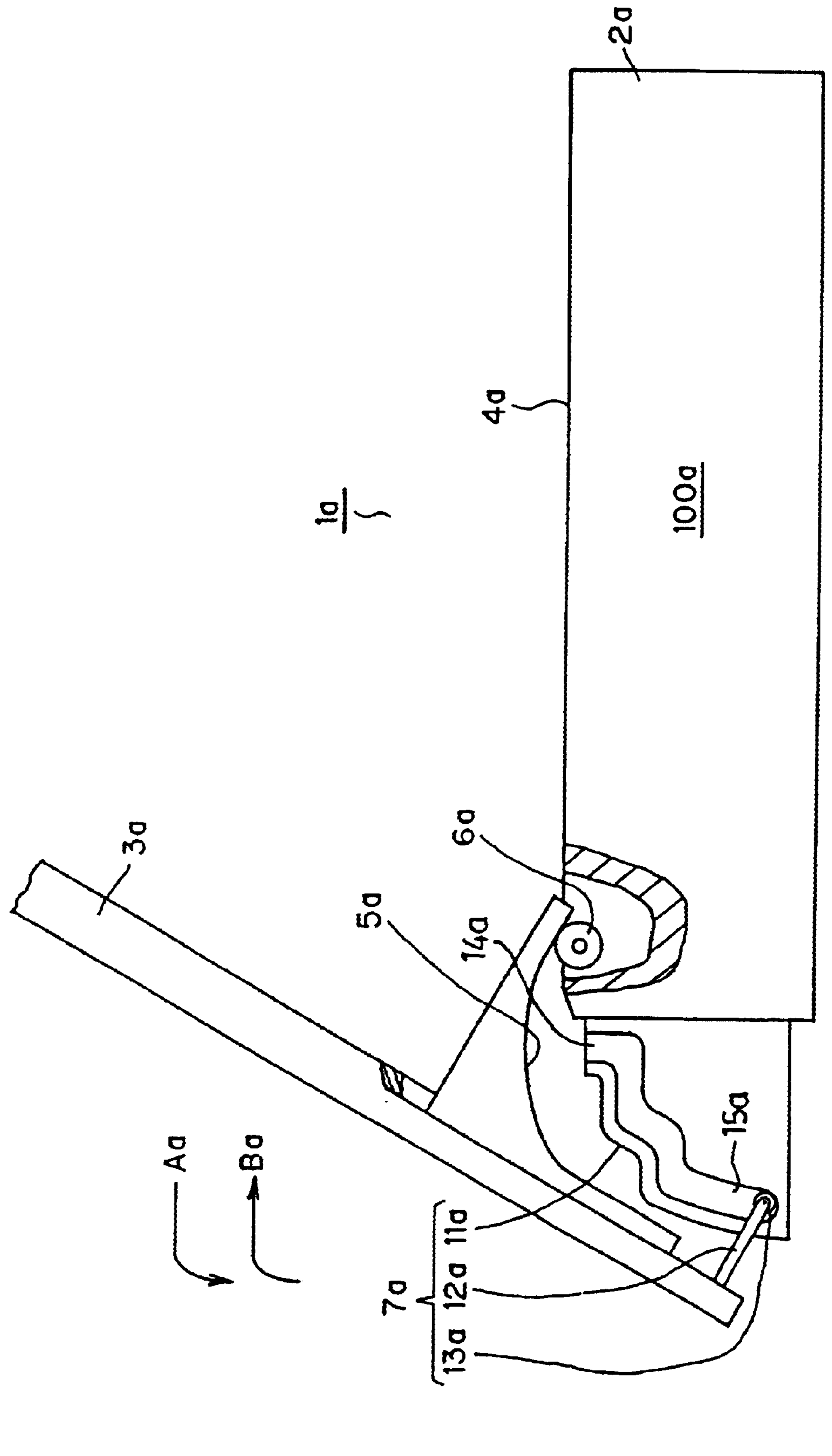
FIG. 9 shows a left side view of the second embodiment shown in FIG. 7, which shows an operating condition of a guide of the housing when the lid is moved and rotated to be in a maximum open position.
Figure 11:
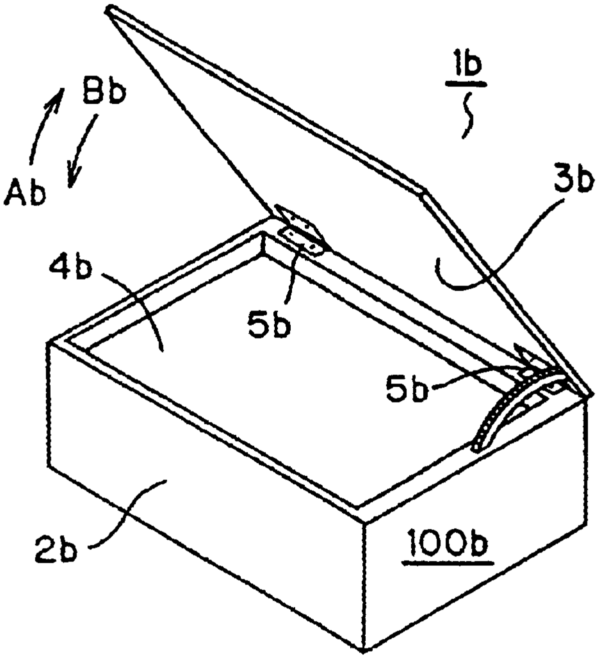
FIG. 11 PRIOR ART
FIG. 11 shows a perspective view, as viewed from before-above, which shows a first prior art housing.
Figure 12:
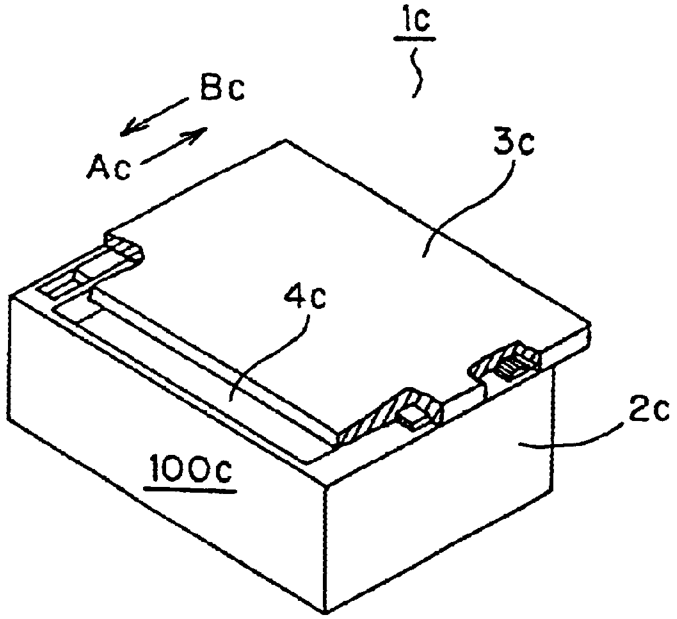
FIG. 12 PRIOR ART
FIG. 12 shows a view corresponding to FIG. 11 which shows a second prior art housing.

As shown in FIG. 10, a regulating body 1 la is formed with a groove 5*a* which extends from the opening 14*a* at a substantially vertical downward angle, then extends in a substantially horizontal rearward direction, next extends in a substantially parabolic curve in the rear downward direction, further extends in the substantially horizontal direction again, and again extends in a substantially parabolic curve in the rear downward direction. Also, the groove 15*a* is formed with a width considerably larger than the diameter of a follower wheel 13*a*.

Because the lid opening/closing mechanism 1*a* is generally configured as described above, when the user drives the output pinion gear 6*a* in the first state (in a closed state of the lid 3*a*) (see FIG. 7), a rotating drive force is given to the engagement body 5*a*. When receiving the drive force from the output pinion gear 6*a*, the engagement body 5*a* slides the lid, which is integral with the engagement body 5*a*, in the horizontal rearward direction, that is, in the direction of arrow Aa. Here, the opening 4*a* of the body 2*a* becomes in a state in which a front part thereof is open (the same as the state shown in FIG. 3 in the operation of the lid opening/closing mechanism 1). When the engagement body 5*a* further receives the drive force from the output pinion gear 6*a*, the lid 3*a* integral with the engagement body 5*a* tries to slide in the horizontal rearward direction, but the follower wheel 13*a* pivotally mounted at the tip end of the support member 12*a* supporting the lid 3*a* moves by being regulated and guided along the first substantially parabolic shape of the groove 15*a* in the regulating body 11*a*, so that it mores downward to a lower position. As a result, the lid 3*a* is turned an intermediate open position the determined by pinion gear 6*a* and the rotating body 13*a*, so that it has moved back while opening the opening 4*a* (see FIG. 8). When the engagement body 5*a* further receives the drive force from the output pinion gear 6*a*, the follower wheel rolls along 11*a* the second horizontal portion of the groove 15*a* in the direction of arrow Aa. As a result, the lid 3*a* slides in the direction of arrow Aa while opening the opening 4*a*. When the engagement body 5*a* further receives the drive force from the output pinion gear 6*a*, the follower wheel 13*a* moves by being regulated and guided along the second substantially parabolic shape portion of the groove 15*a* in the regulating body 11*a*, so that it moves to the lowest position. As a result, the lid 3*a* is turned to a position determined by the supported pinion gear 6*a* and the follower wheel 13*a*, so that it goes back while further opening the opening 4*a*. When the follower wheel 13*a* reaches the end of the groove 15*a* of the regulating body 11*a*, a limiter (not shown) operates to stop the driving of the output pinion gear 6*a*. As a result the opening 4*a* of the body 2*a*, which is a casing for the CD player 100*a*, reaches its most open state (see FIG. 9). Thus, the user of the CD player 100*a* has ample room to perform the desired operation such as the placement of a CD on a turntable (not shown) disposed in the body 2*a* via the opening 4*a*.

After the operation in the body 2*a* is finished, the user operates the output pinion gear 6*a* in the reverse direction. With the output of the output pinion gear 6*a* in the reverse direction, a drive force for turning and sliding the lid 3*a* in the direction of arrow Ba is provided via the engagement body 5*a*. When the engagement body 5*a* receives a relative drive force in the reverse direction from the output pinion gear 6*a*, the position of the lid 3*a*, which is supported by the engagement portion of the output pinion gear 6*a* of the engagement body 5*a* and the follower wheel 13*a*, is determined by these two points. As a result, the lid 3*a* turns and slides in the direction opposite to arrow Aa, that is, in the direction of arrow Ba with respect to the body 2*a*, by which the opening 4*a* changes from the open state to the closed state. When the lid 3*a* returns to the original position with respect to the body 2*a*, a limiter (not shown) operates to stop the output of the output pinion gear 6*a*. Here, the opening 4*a* of the body 2*a* becomes in the closed state by means of the lid 3*a*.

The lid opening/closing mechanism la is configured and operated as described above. Therefore, as with the case where the above-described lid opening/closing mechanism 1 operates, the lid 3 is slidden horizontally and turned with respect to the body 2, by which the lid 3*a* opens and closes the opening 4*a* of the body 2*a*. Thereupon, the space required for the operation of the lid 3 can be decreased, and consequently an effect can be achieved such that the space volume required for the whole system is kept small.

In the lid opening/closing mechanism 1, 1*a*, the engagement body 5, 5*a* is attached on the side of the lid 3, 3*a*, and the output pinion gear 6, 6*a* is provided on the side of the body 2, 2*a*. However, the arrangement of the engagement body 5, 5*a* and the output pinion gear 6, 6*a* may be reverse.

In the lid opening/closing mechanism 1, 1*a*, the engagement body 5, 5*a* is made up of a gear rack and a partial internal gear. However, it is preferable that an engagement body made up of a gear rack or a partial internal gear only be selected appropriately according to the size of the output pinion gear 6, 6*a* and the movement of the lid 3, 3*a*.

In the lid opening/closing mechanism 1, 1*a*, it is preferable that the shape of the groove 15, 15*a* in the regulating body 11, 11*a* of the guide means 7, 7*a* be selected appropriately according to the movement of the lid 3, 3*a*.

Although the housing with the lid opening/closing mechanism 1, 1*a* is incorporated in the CD player 100, 100*a*, the configuration is not limited to this. The housing with the lid opening/closing mechanism 1, 1*a* may be used widely for a storage box, a filing box, and the like.

What is claimed is:

1. A housing comprising a main body having an opening, a lid for covering the opening, guide means for guiding relative movement of the lid with respect to the main body, and a mechanism for opening and closing the lid, wherein the mechanism comprises a drive unit for moving the lid relative to the main body, said drive unit comprising a first part secured to the main body and a second part secured to the lid and arranged to cooperate with the first part, characterized in that:

the drive unit comprises an output rotatable element and an engagement body engaged by the element, the mechanism further comprises means, responsive to driving force of the drive unit in a first direction, for moving the lid relative to the main body from a closed position over a first distance in a first linear direction only, and for subsequently rotating the lid relative to the main body over a second distance in a first rotational direction, thereby lowering a rear edge of the lid from an initial height to a lower position and uncovering the opening of the main body, said means for moving and rotating is further responsive to driving force of the drive unit in a second, reverse, direction, for rotating the lid relative to the main body over said second distance in a second, reverse, rotational direction thereby returning the rear edge of the lid from the lower position to the initial height, and subsequently moving the lid relative to the main body over said first distance in a second, reverse, linear direction, thereby closing the opening of the main body, and during rotation of the lid the engagement between the element and the engagement body is a point of support for the lid, whereby said engagement body also forms part of said guide means.

2. A housing as claimed in claim 1, characterized in that the element is a pinion gear which is part of a drive unit mounted to the main body, the engagement body is fixed to the lid, and the engagement body includes an internal gear section arranged so that during movement in the first rotational direction the internal gear section is driven by the pinion gear and moves a portion of the lid above the internal gear upwards and rearwards.

3. A housing as claimed in claim 2, characterized in that the engagement body further includes a gear rack which merges into the internal gear.

4. A disc player comprising a housing as claimed in claim 1, and a scanning unit provided in the main body of the housing for scanning an information disc, said scanning unit including a turntable for the information disc, said turntable being accessible via the opening in the main body when the opening is uncovered.

5. A disc player as claimed in claim 4, characterized in that the element is a pinion gear which is part of a drive unit mounted to the main body, the engagement body is fixed to the lid, and the engagement body includes an internal gear section arranged so that during movement in the first rotational direction the internal gear section is driven by the pinion gear and moves a portion of the lid above the internal gear upwards and rearwards.

6. A housing as claimed in claim 5, characterized in that the guide means comprises:

a body having a groove having first and second groove portions, the first portion extending substantially parallel to said first linear direction, and the second portion extending downwards from a rear end of the first portion, and follower means engaging the groove, and said guide means and said engagement body cooperate to define the position of the lid while the lid is being rotated.

7. A housing as claimed in claim 6, characterized in that the groove has an upper opening through which the follower means can be moved by a user, in order to remove the lid from the housing.

8. A housing comprising a main body having an opening, a lid for covering the opening, guide means for guiding relative movement of the lid with respect to the main body, and a mechanism for opening and closing the lid, wherein the mechanism comprises a drive unit for moving the lid relative to the main body, said drive unit comprising a first part secured to the main body and a second part secured to the lid and arranged to cooperate with the first part, characterized in that:

the mechanism further comprises means, responsive to driving force of the drive unit in a first direction, for moving the lid relative to the main body from a closed position over a first distance in a first linear direction only, and for subsequently rotating the lid relative to the main body over a second distance in a first rotational direction, thereby lowering a rear edge of the lid from an initial height to a lower position and uncovering the opening of the main body, said means for moving and rotating is further responsive to driving force of the drive unit in a second, reverse, direction, for rotating the lid relative to the main body over said second distance in a second, reverse, rotational direction thereby returning the rear edge of the lid from the lower position to the initial height, and subsequently moving the lid relative to the main body over said first distance in a second, reverse, linear direction, thereby closing the opening of the main body, the guide means comprises a body having a groove with groove portions extending in different directions, and follower means engaging the groove, a first of said portions is substantially parallel to said first linear direction, and a second of said portions extends downwards from a rear end of the first portion, the second of said portions has a closed lower end, and in said lower position engagement of said follower means with the closed lower end is a point of support for the lid.

9. A housing comprising a main body having an opening, a lid for covering the opening, guide means for guiding relative movement of the lid with respect to the main body, and a mechanism for opening and closing the lid, wherein the mechanism comprises a drive unit for moving the lid relative to the main body, said drive unit comprising a first part secured to the main body and a second part secured to the lid and arranged to cooperate with the first part, characterized in that:

the mechanism further comprises means, responsive to driving force of the drive unit in a first direction, for moving the lid relative to the main body from a closed position over a first distance in a first linear direction only, and for subsequently rotating the lid relative to the main body over a second distance in a first rotational direction, thereby lowering a rear edge of the lid from an initial height to a lower position and uncovering the opening of the main body, said means for moving and rotating is further responsive to driving force of the drive unit in a second, reverse, direction, for rotating the lid relative to the main body over said second distance in a second, reverse, rotational direction thereby returning the rear edge of the lid from the lower position to the initial height, and subsequently moving the lid relative to the main body over said first distance in a second, reverse, linear direction, thereby closing the opening of the main body, the guide means comprises a body having a groove with groove portions extending in different directions, and follower means engaging the groove, a first of said portions is substantially parallel to said first linear direction, and a second of said portions extends downwards from a rear end of the first portion, and the groove has an upper opening through which the follower means can be moved by a user to remove the lid from the housing.

10. A housing comprising a main body having an opening, a lid for covering the opening, guide means for guiding relative movement of the lid with respect to the main body, and a mechanism for opening and closing the lid, wherein the mechanism comprises a drive unit for moving the lid relative to the main body, said drive unit comprising a first part secured to the main body and a second part secured to the lid and arranged to cooperate with the first part, characterized in that:

the mechanism further comprises means, responsive to driving force of the drive unit in a first direction, for moving the lid relative to the main body from a closed position over a first distance in a first linear direction only, and for subsequently rotating the lid relative to the main body over a second distance in a first rotational direction, thereby lowering a rear edge of the lid from an initial height to a lower position and uncovering the opening of the main body, said means for moving and rotating is further responsive to driving force of the drive unit in a second, reverse, direction, for rotating the lid relative to the main body over said second distance in a second, reverse, rotational direction thereby returning the rear edge of the lid from the lower position to the initial height, and subsequently moving the lid relative to the main body over said first distance in a second, reverse, linear direction, thereby closing the opening of the main body, the guide means comprises a body having a groove with groove portions extending in different directions, and follower means engaging the groove, a first of said portions is substantially parallel to said first linear direction, and a second of said portions extends downwards from a rear end of the first portion, the guide means further comprises a support extending from a lower side of the lid, and said follower means comprises a follower wheel rotatably mounted to said support, spaced from said lower side.

11. A housing comprising a main body having an opening, a lid for covering the opening, guide means for guiding relative movement of the lid with respect to the main body, and a mechanism for opening and closing the lid, wherein the mechanism comprises a drive unit for moving the lid relative to the main body, said drive unit comprising a first part secured to the main body and a second part secured to the lid and arranged to cooperate with the first part, characterized in that:

the mechanism further comprises means, responsive to driving force of the drive unit in a first direction, for moving the lid relative to the main body from a closed position over a first distance in a first linear direction only, and for subsequently rotating the lid relative to the main body over a second distance in a first rotational direction, thereby lowering a rear edge of the lid from an initial height to a lower position and uncovering the opening of the main body, said means for moving and rotating is further responsive to driving force of the drive unit in a second, reverse, direction, for rotating the lid relative to the main body over said second distance in a second, reverse, rotational direction thereby returning the rear edge of the lid from the lower position to the initial height, and subsequently moving the lid relative to the main body over said first distance in a second, reverse, linear direction, thereby closing the opening of the main body, the guide means comprises a body having a groove with groove portions extending in different directions, and follower means engaging the groove, a first of said portions is substantially parallel to said first linear direction, and a second of said portions extends downwards from a rear end of the first portion, the drive unit comprises an output rotatable element and an engagement body engaged by the element, and during rotation of the lid the engagement between the element and the engagement body is a point of support for the lid, whereby said engagement body also forms part of said guide means.

12. A housing as claimed in claim 11, characterized in that:

the element is a pinion gear which is part of a drive unit mounted to the main body, the engagement body is fixed to the lid, the engagement body includes an internal gear section arranged so that during movement in the first rotational direction the internal gear section is driven by the pinion gear and moves a portion of the lid above the internal gear upwards and rearwards, and said guide means and said engagement body cooperate to define the position of the lid while the lid is being rotated.

13. A housing as claimed in claim 12, characterized in that the second of said portions has a closed lower end, and in said lower position engagement of said follower means with the closed lower end is a point of support for the lid.

14. A housing as claimed in claim 12, characterized in that the groove has an upper opening through which the follower means can be moved by a user, in order to remove the lid from the housing.

15. A housing as claimed in claim 14, characterized in that the guide means further comprises a support extending from a lower side of the lid, and said follower means comprises a follower wheel rotatably mounted to said support, spaced from said lower side.

* * * * *